US011669464B1

(12) United States Patent
Bilski et al.

(10) Patent No.: US 11,669,464 B1
(45) Date of Patent: Jun. 6, 2023

(54) MULTI-ADDRESSING MODE FOR DMA AND NON-SEQUENTIAL READ AND WRITE PATTERNS

(71) Applicant: XILINX, INC., San Jose, CA (US)

(72) Inventors: Goran Hk Bilski, Molndal (SE); Baris Ozgul, Dublin (IE); David Clarke, Dublin (IE); Juan J. Noguera Serra, San Jose, CA (US); Jan Langer, Chemnitz (DE); Zachary Dickman, Dublin (IE); Sneha Bhalchandra Date, San Jose, CA (US); Tim Tuan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 139 days.

(21) Appl. No.: 16/858,417

(22) Filed: Apr. 24, 2020

(51) Int. Cl.
| | |
|---|---|
| *G06F 12/1081* | (2016.01) |
| *G06F 12/06* | (2006.01) |
| *G06F 9/52* | (2006.01) |
| *G06F 15/78* | (2006.01) |
| *G06F 12/02* | (2006.01) |

(52) U.S. Cl.
CPC .......... *G06F 12/1081* (2013.01); *G06F 9/524* (2013.01); *G06F 12/0246* (2013.01); *G06F 12/0607* (2013.01); *G06F 15/7807* (2013.01)

(58) Field of Classification Search
CPC .. G06F 12/1081; G06F 9/524; G06F 12/0246; G06F 12/0607; G06F 15/7807
See application file for complete search history.

(56) References Cited

U.S. PATENT DOCUMENTS

| 5,678,063 | A | * | 10/1997 | Odom | .............. | G01R 31/31907 |
| | | | | | | 710/22 |
| 6,182,165 | B1 | * | 1/2001 | Spilo | ...................... | G06F 13/28 |
| | | | | | | 455/12.1 |
| 6,807,587 | B1 | * | 10/2004 | Murray | .................. | G06F 13/28 |
| | | | | | | 710/22 |
| 7,330,862 | B1 | * | 2/2008 | Srinivasan | .......... | G06F 12/0866 |
| 7,620,749 | B2 | | 11/2009 | Biran et al. | | |
| 8,166,275 | B2 | | 4/2012 | Drori et al. | | |
| 8,250,251 | B2 | | 8/2012 | Malalur | | |
| 9,164,936 | B2 | | 10/2015 | Litch et al. | | |
| 9,952,831 | B1 | * | 4/2018 | Ross | ........................ | G06F 7/78 |

(Continued)

*Primary Examiner* — Tasnima Matin
(74) *Attorney, Agent, or Firm* — Patterson + Sheridan, LLP

(57) ABSTRACT

Examples herein describe performing non-sequential DMA read and writes. Rather than storing data sequentially, a DMA engine can write data into memory using non-sequential memory addresses. A data processing engine (DPE) controller can submit a first job using first parameters that instruct the DMA engine to store data using a first non-sequential write pattern. The DPE controller can also submit a second job using second parameters that instruct the DMA engine to store data using a second, different non-sequential write pattern. In this manner, the DMA engine can switch to performing DMA writes using different non-sequential patterns. Similarly, the DMA engine can use non-sequential reads to retrieve data from memory. When performing a first DMA read, the DMA engine can retrieve data from memory using a first sequential pattern and then perform a second DMA read where data is retrieved from memory using a second non-sequential read pattern.

20 Claims, 6 Drawing Sheets

(56) References Cited

U.S. PATENT DOCUMENTS

| | | | |
|---|---|---|---|
| 2007/0174841 A1* | 7/2007 | Chamberlain | G06F 9/3879 |
| | | | 719/310 |
| 2008/0301256 A1* | 12/2008 | McWilliams | G06F 12/0806 |
| | | | 709/214 |
| 2014/0189169 A1 | 7/2014 | Litch et al. | |
| 2014/0215103 A1* | 7/2014 | Cohen | G06F 13/28 |
| | | | 710/23 |
| 2014/0379970 A1* | 12/2014 | Cheon | G06F 3/0679 |
| | | | 711/103 |
| 2015/0095723 A1* | 4/2015 | Han | G11C 7/1006 |
| | | | 714/54 |
| 2019/0303328 A1* | 10/2019 | Balski | G06F 15/7807 |

* cited by examiner

MULTI-ADDRESSING MODE FOR DMA AND NON-SEQUENTIAL READ AND WRITE PATTERNS

TECHNICAL FIELD

Examples of the present disclosure generally relate to using non-sequential read and write patterns when performing direct memory access (DMA) read and writes.

BACKGROUND

A system on a chip (SoC) can include a mix of programmable logic (e.g., programmable fabric) and software-configurable hardened logic such as processing cores or engines. The cores or engines can include DMA engines for storing and retrieving data in memory. That is, the DMA engines can perform DMA read and writes to the memory. When performing the read and writes, the DMA engine generates sequential memory addresses. For example; when storing received data in the memory, the DMA engine generates addresses for sequential memory locations in the memory. That is, as different data chunks are received, the DMA engine stores the data chunks in sequential memory locations. Similarly, when performing a DMA read, the DMA engine retrieves data from sequential memory locations and then forwards this data (in the order it was retrieved) to a target location in the SoC.

SUMMARY

Techniques for performing DMA read and writes using non-sequential read and write patterns described. One example is an integrated circuit (IC) that includes a switch, a DMA engine, and a memory. The DMA engine is configured to receive a DMA write request to write data received from the switch into the memory using a non-sequential write pattern and generate memory addresses to perform the DMA write request according to the non-sequential write pattern.

One example described herein is a system on a chip (SoC) that includes a DPE controller, a DMA engine, and a memory. The DPE controller is configured to submit a first DMA write associated with first parameters to the DMA engine where the first parameters define a first non-sequential write pattern and submit a second DMA write associated with second parameters to the DMA engine where the second parameters define a second non-sequential write pattern different from the first non-sequential write pattern. The DMA engine is configured to perform the first DMA write by writing data into the memory based on the first non-sequential write pattern and perform the second DMA write by writing data into the memory based on the second non-sequential write pattern.

One example described herein is a method that includes submitting a first DMA write associated with first parameters to the DMA engine where the first parameters define a non-sequential write pattern, submitting a second DMA write associated with second parameters to the DMA engine where the second parameters defines a sequential write pattern, performing the first DMA write by writing data into the memory based on the non-sequential write pattern, and performing the second DMA write by writing data into the memory based on the sequential write pattern.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
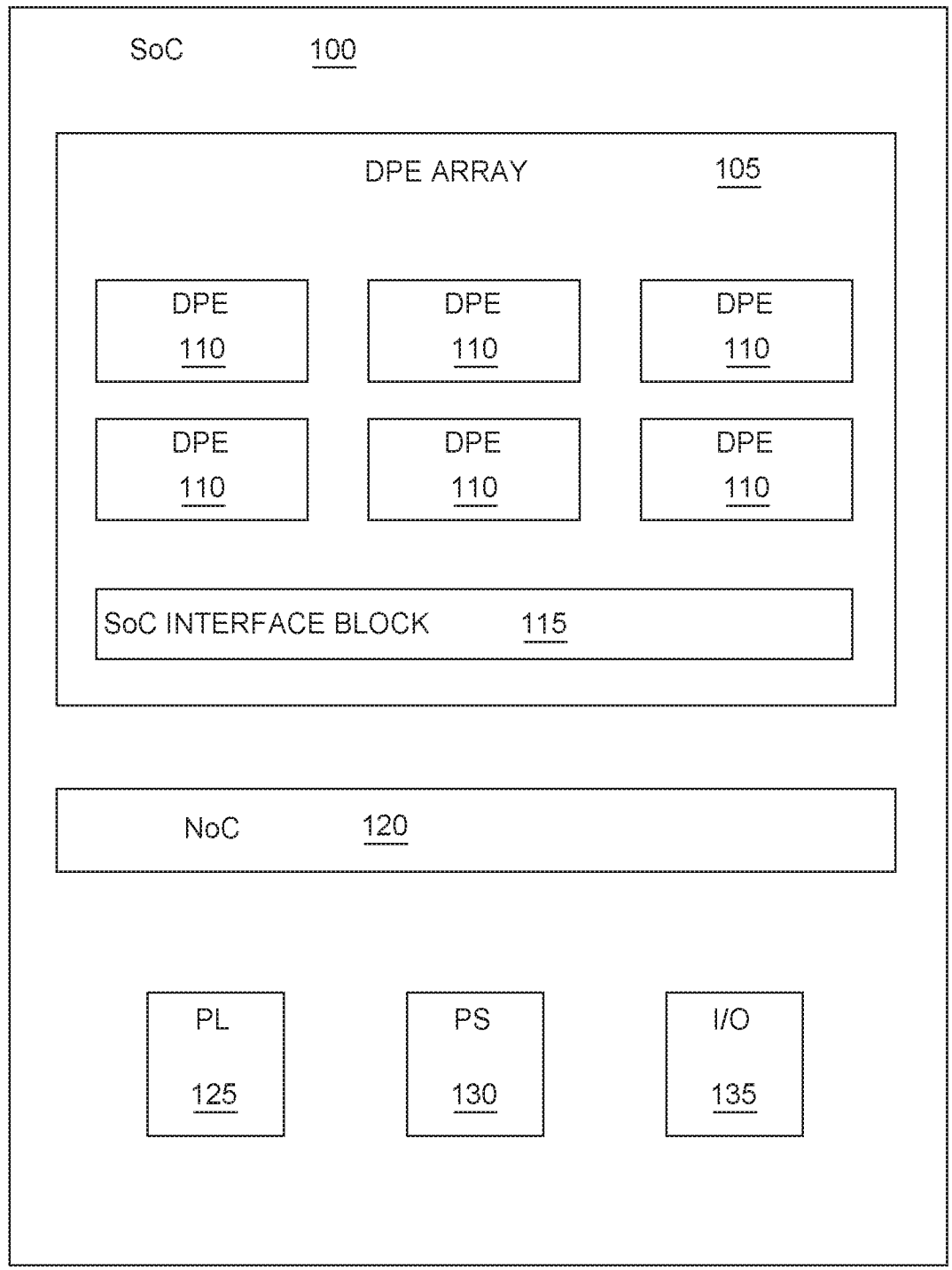
FIG. 1 is a block diagram of a SoC that includes a data processing engine array, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for performing non-sequential DMA read and writes. Rather than storing data sequentially, a DMA engine can write data into memory using non-sequential memory addresses. A DPE controller can submit a first job using first parameters that instruct the DMA engine to store data using a first non-sequential write pattern. The DPE controller can also submit a second job using second parameters that instruct the DMA engine to store data using a second, different non-sequential write pattern. In this manner, the DMA engine can switch, during runtime, to performing DMA writes using different non-sequential write patterns. Similarly, the DMA engine can use non-sequential reads to retrieve data from memory. That is, when performing a first DMA read, the DMA engine can retrieve data from memory using a first sequential pattern and then switch to performing a second DMA read where data is retrieved from memory using a second non-sequential read pattern. As used herein, "sequential" and "sequentially" means directly neighboring (either directly following or directly preceding).

FIG. 1 is a block diagram of a SoC 100 that includes a data processing engine (DPE) array 105, according to an example. The DPE array 105 includes a plurality of DPEs 110 which may be arranged in a grid, cluster, or checkerboard pattern in the SoC 100. Although FIG. 1 illustrates arranging the DPEs 110 in a 2D array with rows and columns, the embodiments are not limited to this arrangement. Further, the array 105 can be any size and have any number of rows and columns formed by the DPEs 110.

In one embodiment, the DPEs 110 are identical. That is, each of the DPEs 110 (also referred to as tiles or blocks) may have the same hardware components or circuitry. Further, the embodiments herein are not limited to DPEs 110. Instead, the SoC 100 can include an array of any kind of processing elements, for example, the DPEs 110 could be digital signal processing engines, cryptographic engines, Forward Error Correction (FEC) engines, or other specialized hardware for performing one or more specialized tasks.

In FIG. 1, the array 105 includes DPEs 110 that are all the same type (e.g., a homogeneous array). However, in another embodiment, the array 105 may include different types of engines. For example, the array 105 may include digital signal processing engines, cryptographic engines, graphic processing engines, and the like. Regardless if the array 105 is homogenous or heterogeneous, the DPEs 110 can include direct connections between DPEs 110 which permit the DPEs 110 to transfer data directly as described in more detail below.

In one embodiment, the DPEs 110 are formed from software-configurable hardened logic—i.e., are hardened. One advantage of doing so is that the DPEs 110 may take up less space in the SoC 100 relative to using programmable logic to form the hardware elements in the DPEs 110. That is, using hardened logic circuitry to form the hardware elements in the DPE 110 such as program memories, an instruction fetch/decode unit, fixed-point vector units, floating-point vector units, arithmetic logic units (ALUs), multiply accumulators (MAC), and the like can significantly reduce the footprint of the array 105 in the SoC 100. Although the DPEs 110 may be hardened, this does not mean the DPEs 110 are not programmable. That is, the DPEs 110 can be configured when the SoC 100 is powered on or rebooted to perform different functions or tasks.

The DPE array 105 also includes a SoC interface block 115 (also referred to as a shim) that serves as a communication interface between the DPEs 110 and other hardware components in the SoC 100. In this example, the SoC 100 includes a network on chip (NoC) 120 that is communicatively coupled to the SOC interface block 115. Although not shown, the NoC 120 may extend throughout the SoC 100 to permit the various components in the SoC 100 to communicate with each other. For example, in one physical implementation, the DPE array 105 may be disposed in an upper right portion of the integrated circuit forming the SoC 100. However, using the NoC 120, the array 105 can nonetheless communicate with, for example, programmable logic (PL) 125, a processor subsystem (PS) 130 or input/output (I/O) 135 which may be disposed at different locations throughout the SoC 100.

In addition to providing an interface between the DPEs 110 and the NoC 120, the SoC interface block 115 may also provide a connection directly to a communication fabric in the PL 125. In this example, the PL 125 and the DPEs 110 form a heterogeneous processing system since some of the kernels in a dataflow graph may be assigned to the DPEs 110 for execution while others are assigned to the PL 125. While FIG. 1 illustrates a heterogeneous processing system in a SoC, in other examples, the heterogeneous processing system can include multiple devices or chips. For example, the heterogeneous processing system could include two FPGAs or other specialized accelerator chips that are either the same type or different types. Further, the heterogeneous processing system could include two communicatively coupled SoCs.

Figure 2:
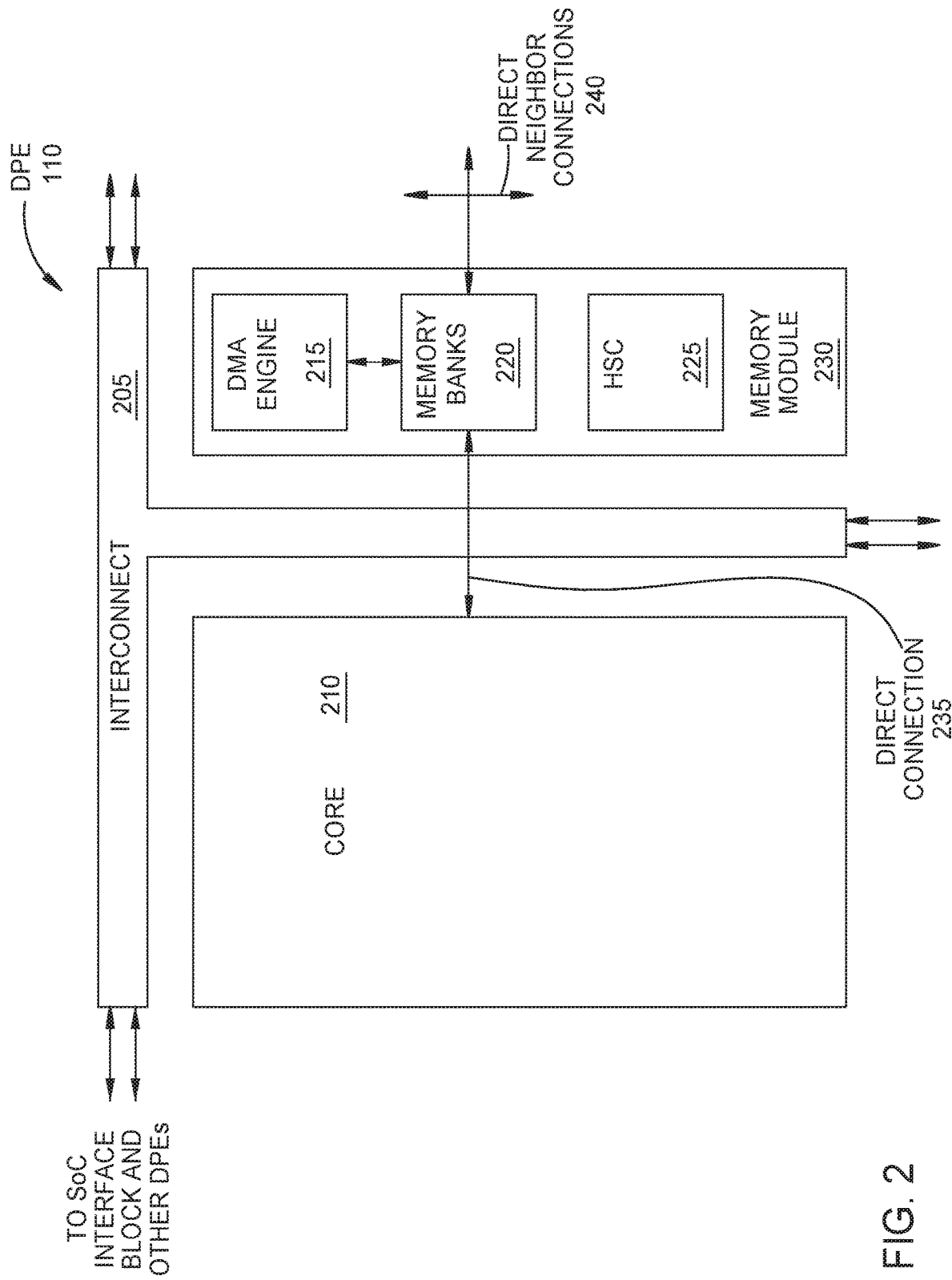
FIG. 2 is a block diagram of a data processing engine in the data processing engine array, according to an example.

This can be difficult for a programmer to manage since communicating between kernels disposed in heterogeneous or different processing cores can include using the various communication interfaces shown in FIG. 1 such as the NoC 120, the SoC interface block 115, as well as the communication links between the DPEs 110 in the array 105 (which are shown in FIG. 2).

In one embodiment, the SoC interface block 115 includes separate hardware components for communicatively coupling the DPEs 110 to the NoC 120 and to the PL 125 that is disposed near the array 105 in the SoC 100. In one embodiment, the SoC interface block 115 can stream data directly to a fabric for the PL 125. For example, the PL 125 may include an FPGA fabric which the SoC interface block 115 can stream data into, and receive data from, without using the NoC 120. That is, the circuit switching and packet switching described herein can be used to communicatively couple the DPEs 110 to the SoC interface block 115 and also to the other hardware blocks in the SoC 100. In another example, SoC interface block 115 may be implemented in a different die than the DPEs 110. In yet another example, DPE array 105 and at least one subsystem may be implemented in a same die while other subsystems and/or other DPE arrays are implemented in other dies. Moreover, the streaming interconnect and routing described herein with respect to the DPEs 110 in the DPE array 105 can also apply to data routed through the SoC interface block 115.

Although FIG. 1 illustrates one block of PL 125, the SoC 100 may include multiple blocks of PL 125 (also referred to as configuration logic blocks) that can be disposed at different locations in the SoC 100. For example, the SoC 100 may include hardware elements that form a field programmable gate array (FPGA). However, in other embodiments, the SoC 100 may not include any PL 125—e.g., the SoC 100 is an ASIC.

FIG. 2 is a block diagram of a DPE 110 in the DPE array 105 illustrated in FIG. 1, according to an example. The DPE 110 includes an interconnect 205, a core 210, and a memory module 230. The interconnect 205 permits data to be transferred from the core 210 and the memory module 230 to different cores in the array 105. That is, the interconnect 205 in each of the DPEs 110 may be connected to each other so that data can be transferred north and south (e.g., up and down) as well as east and west (e.g., right and left) in the array of DPEs 110.

Referring back to FIG. 1, in one embodiment, the DPEs 110 in the upper row of the array 105 relies on the interconnects 205 in the DPEs 110 in the lower row to communicate with the SoC interface block 115. For example, to transmit data to the SoC interface block 115, a core 210 in a DPE 110 in the upper row transmits data to its interconnect 205 which is in turn communicatively coupled to the interconnect 205 in the DPE 110 in the lower row. The interconnect 205 in the lower row is connected to the SoC interface block 115. The process may be reversed where data intended for a DPE 110 in the upper row is first transmitted from the SoC interface block 115 to the interconnect 205 in the lower row and then to the interconnect 205 in the upper row that is the target DPE 110. In this manner, DPEs 110 in the upper rows may rely on the interconnects 205 in the DPEs 110 in the lower rows to transmit data to and receive data from the SoC interface block 115.

In one embodiment, the interconnect 205 includes a configurable switching network that permits the user to determine how data is routed through the interconnect 205. In one embodiment, unlike in a packet routing network, the interconnect 205 may form streaming point-to-point connections. That is, the streaming connections and streaming interconnects (not shown in FIG. 2) in the interconnect 205 may form routes from the core 210 and the memory module 230 to the neighboring DPEs 110 or the SoC interface block 115. Once configured, the core 210 and the memory module 230 can transmit and receive streaming data along those routes. In one embodiment, the interconnect 205 is configured using the Advanced Extensible Interface (AXI) 4 Streaming protocol.

In addition to forming a streaming network, the interconnect 205 may include a separate network for programming or configuring the hardware elements in the DPE 110. Although not shown, the interconnect 205 may include a memory mapped interconnect which includes different connections and switch elements used to set values of configuration registers in the DPE 110 that alter or set functions of the streaming network, the core 210, and the memory module 230.

In one embodiment, streaming interconnects (or network) in the interconnect 205 support two different modes of operation referred to herein as circuit switching and packet switching. In one embodiment, both of these modes are part of, or compatible with, the same streaming protocol—e.g., an AXI Streaming protocol. Circuit switching relies on reserved point-to-point communication paths between a source DPE 110 to one or more destination DPEs 110. In one embodiment, the point-40-point communication path used when performing circuit switching in the interconnect 205 is not shared with other streams (regardless whether those streams are circuit switched or packet switched). However, when transmitting streaming data between two or more DPEs 110 using packet-switching, the same physical wires can be shared with other logical streams.

The core 210 may include hardware elements for processing digital signals. For example, the core 210 may be used to process signals related to wireless communication, radar, vector operations, machine learning applications, and the like. As such, the core 210 may include program memories, an instruction fetch/decode unit, fixed-point vector units, floating-point vector units, arithmetic logic units (ALUs), multiply accumulators (MAC), and the like. However, as mentioned above, this disclosure is not limited to DPEs 110. The hardware elements in the core 210 may change depending on the engine type. That is, the cores in a digital signal processing engine, cryptographic engine, or FEC may be different.

The memory module 230 includes a DMA engine 215, memory banks 220, and hardware synchronization circuitry (HSC) 225 or other type of hardware synchronization block. In one embodiment, the DMA engine 215 enables data to be received by, and transmitted to, the interconnect 205. That is, the DMA engine 215 may be used to perform DMA reads and write to the memory banks 220 using data received via the interconnect 205 from the SoC interface block or other DPEs 110 in the array.

The memory banks 220 can include any number of physical memory elements (e.g., SRAM). For example, the memory module 230 may be include 4, 8, 16, 32, etc. different memory banks 220. In this embodiment, the core 210 has a direct connection 235 to the memory banks 220. Stated differently, the core 210 can write data to, or read data from, the memory banks 220 without using the interconnect 205. That is, the direct connection 235 may be separate from the interconnect 205. In one embodiment, one or more wires in the direct connection 235 communicatively couple the core 210 to a memory interface in the memory module 230 which is in turn coupled to the memory banks 220.

In one embodiment, the memory module 230 also has direct connections 240 to cores in neighboring DPEs 110. Put differently, a neighboring DPE in the array can read data from, or write data into, the memory banks 220 using the direct neighbor connections 240 without relying on their interconnects or the interconnect 205 shown in FIG. 2. The HSC 225 can be used to govern or protect access to the memory banks 220. In one embodiment, before the core 210 or a core in a neighboring DPE can read data from, or write data into, the memory banks 220, the core (or the DMA engine 215) requests a lock acquire to the HSC 225 when it wants to read or write to the memory banks 220 (i.e., when the core/DMA engine want to "own" a buffer, which is an assigned portion of the memory banks 220. If the core or DMA engine does not acquire the lock, the HSC 225 will stall (e.g., stop) the core or DMA engine from accessing the memory banks 220. When the core or DMA engine is done with the buffer, they release the lock to the HSB 225. In one embodiment, the HSC 225 synchronizes the DMA engine 215 and core 210 in the same DPE 110 (i.e., memory banks 220 in one DPE 110 are shared between the DMA engine 215 and the core 210). Once the write is complete, the core (or the DMA engine 215) can release the lock which permits cores in neighboring DPEs to read the data.

Because the core 210 and the cores in neighboring DPEs 110 can directly access the memory module 230, the memory banks 220 can be considered as shared memory between the DPEs 110. That is, the neighboring DPEs can directly access the memory banks 220 in a similar way as the core 210 that is in the same DPE 110 as the memory banks 220. Thus, if the core 210 wants to transmit data to a core in a neighboring DPE, the core 210 can write the data into the memory bank 220. The neighboring DPE can then retrieve the data from the memory bank 220 and begin processing the data. In this manner, the cores in neighboring DPEs 110 can transfer data using the HSC 225 while avoiding the extra latency introduced when using the interconnects 205. In contrast, if the core 210 wants to transfer data to a non-neighboring DPE in the array (i.e., a DPE without a direct connection 240 to the memory module 230), the core 210 uses the interconnects 205 to route the data to the memory module of the target DPE which may take longer to complete because of the added latency of using the interconnect 205 and because the data is copied into the memory module of the target DPE rather than being read from a shared memory module.

In addition to sharing the memory modules 230, the core 210 can have a direct connection to cores 210 in neighboring DPEs 110 using a core-to-core communication link (not shown). That is, instead of using either a shared memory module 230 or the interconnect 205, the core 210 can transmit data to another core in the array directly without storing the data in a memory module 230 or using the interconnect 205 (which can have buffers or other queues). For example, communicating using the core-to-core communication links may use less latency (or have high bandwidth) than transmitting data using the interconnect 205 or shared memory (which requires a core to write the data and then another core to read the data) which can offer more cost effective communication. In one embodiment, the core-to-core communication links can transmit data between two cores 210 in one clock cycle. In one embodiment, the data is transmitted between the cores on the link without being stored in any memory elements external to the cores 210. In one embodiment, the core 210 can transmit a data word or vector to a neighboring core using the links every clock cycle, but this is not a requirement.

In one embodiment, the communication links are streaming data links which permit the core 210 to stream data to a neighboring core. Further, the core 210 can include any number of communication links which can extend to different cores in the array. In this example, the DPE 110 has respective core-to-core communication links to cores located in DPEs in the array that are to the right and left (east and west) and up and down (north or south) of the core 210. However, in other embodiments, the core 210 in the DPE 110 illustrated in FIG. 2 may also have core-to-core communication links to cores disposed at a diagonal from the core 210. Further, if the core 210 is disposed at a bottom periphery or edge of the array, the core may have core-to-core communication links to only the cores to the left, right, and bottom of the core 210.

However, using shared memory in the memory module 230 or the core-to-core communication links may be available if the destination of the data generated by the core 210 is a neighboring core or DPE. For example, if the data is destined for a non-neighboring DPE (i.e., any DPE that DPE 110 does not have a direct neighboring connection 240 or a core-to-core communication link), the core 210 uses the interconnects 205 in the DPEs to route the data to the appropriate destination. As mentioned above, the interconnects 205 in the DPEs 110 may be configured when the SoC is being booted up to establish point-to-point streaming connections to non-neighboring DPEs to which the core 210 will transmit data during operation.

Figure 3:
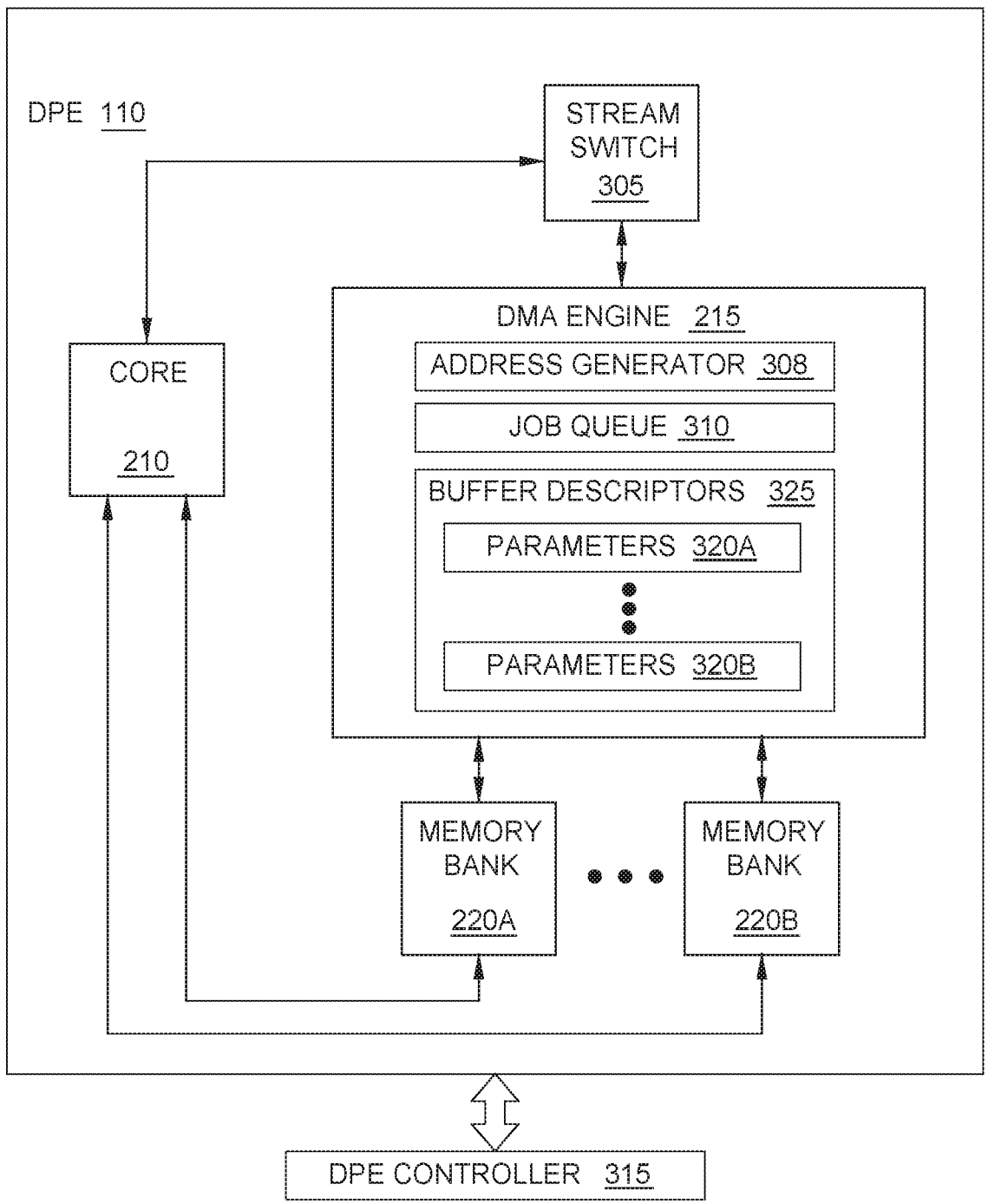
FIG. 3 is a block diagram of a system for performing non-sequential DMA reads and writes, according to an example.

FIG. 3 is a block diagram of a system for performing non-sequential DMA reads and writes, according to an example. FIG. 3 illustrates different components within the SoC 100. For ease of explanation, FIG. 3 illustrates a single DPE 110, but the discussion herein can apply to any DPE in the SoC 100.

In this example, the DPE 110 includes the core 210, the DMA engine 215, memory banks 220A and 220B, and a stream switch 305. In one embodiment, the stream switch 305 is part of the interconnect 205 illustrated in FIG. 2. In one embodiment, the stream switch 305 receives streaming data from a different stream switch in the DPE array (e.g.: a stream switch in an interconnect for a different DPE) which it then forwards to the DMA engine 215 or to the core 210. That is, the stream switch 305 can be configured to have one route where received data is forwarded directly to the core 210 and another route where the data is forwarded to the DMA engine 215 which executes a DMA write to store the data into the memory banks 220. Although streaming data is specifically discussed, the embodiments herein can be used with any type of data transfer mechanism that relies on a DMA engine to store data.

In addition to storing data, the DMA engine 215 can also perform a DMA read to retrieve data from the memory banks 220 and forward the retrieved data to the stream switch 305. The stream switch 305 can then use the techniques discussed above to forward the data to another part of the SoC 100—e.g., to a different DPE or to the SoC interface block or to the PL 125.

When performing a DMA write, the DMA engine 215 can write the data into the memory banks 220 using a non-sequential write pattern. For example, the DMA engine 215 can write a first chunk of data received from the stream switch 305 into the memory bank 220A and a second, next chunk of data received from the stream switch 305 into a different non-sequential address. Previously, an address generator 308 in the DMA engine 215 was limited to writing data into sequential memory addresses. That is, the address generator 308 would generate memory addresses to write the sequentially received data chunks from the stream switch 305 into sequential memory locations. Stated differently, instead of being able to write the first and second chunks into two different memory banks 220 (or into two different non-contiguous memory locations in the same bank 220), the address generator 308 could only assign sequential memory addresses to the chunks of data received from the stream switch 305. However, in the embodiments herein, the address generator 308 can use a non-sequential write pattern to generate memory addresses that store sequentially received data into non-sequential memory locations in the memory banks 220.

There are many different situations where it may be efficient or desired to store sequentially received data into non-sequential memory locations. In one example, the core 210 may be tasked with performing a transpose on a matrix of data (e.g., transpose a 5×7 matrix of data into a 7×5 matrix of data). Rather than transmitting the received data to the core to perform the matrix transpose (e.g., a type of matrix function), the DMA engine 215 can use a non-sequential write pattern to store the data in the memory banks 220 in a manner that transposes the matrix. That is, the stream switch 305 forwards a 5×7 matrix of data to the DMA engine 215 but, by using the non-sequential write pattern, the address generator 308 generates addresses that store the data as a 7×5 matrix of data. Thus, when the core 210 retrieves the data from the memory banks 220, the matrix transposition has already been performed. In this manner, the DMA write can be leveraged to inherently perform the matrix transposition as it stores the data into memory using a non-sequential write pattern.

In another examples, storing sequentially received data into non-sequential memory locations may be helpful to select a subportion of a matrix (e.g., another type of matrix function). For example, the DMA engine 215 may receive a 4×4 matrix of data and place it into a 8×8 buffer in memory, in the next iteration it receives another 4×4 matrix and places it into a different position in the 6×8 buffer in memory. After two more iterations the full 8×8 matrix is set in memory in a way which allows the core 210 to operate efficiently on it. In another embodiment, the DMA engine 215 may receive interleaved wireless data from multiple carriers or from multiple users. The DMA engine 215 can use a non-sequential write pattern to de-interleave the wireless data so that the data from a first carrier or user is stored in the memory bank 220A, the data from a second carrier or user is stored in the memory bank 220B, the data from a third carrier or user is stored in a third memory bank, and so forth. Thus, the core 210 does not need to de-interleave the data before it can process the data corresponding to a particular carrier or user separately from the data corresponding to a different carrier or user. The core 210 can simply read from one of the memory banks 220 to retrieve the de-interleaved data.

When performing a DMA read, the DMA engine 215 can retrieve data from the memory banks 220 using a non-sequential read pattern. For example, the DMA engine 215 can read a first chunk of data from the memory bank 220A and a second chunk of data from the memory bank 220B, or read the first chunk of data from a first memory address in the memory bank 220A and the second chunk of data from a second memory address in the memory bank 220A that is non-contiguous with the first memory address. The first and second chunks of data can then be streamed from the stream switch 305 sequentially. Previously, the DMA engine 215 was limited to reading data from sequential memory addresses. In the embodiments herein, the address generator 308 uses a non-sequential read pattern to generate memory addresses that retrieves data from non-sequential memory locations in the memory banks 220.

There are many reasons why the DMA engine 215 may be instructed to retrieve data from non-sequential memory locations when performing a DMA read. For example, the target device may want carrier wireless data interleaved although the data for each carrier was stored in non-contiguous memory locations—e.g., in different memory banks 220 or in different, non-contiguous portions of the same memory bank.

While FIG. 3 illustrates a single DMA engine 215 to perform DMA reads and writes, this DMA engine 215 may represent at least two DMA engines where one or more DMA engines perform DMA reads while one or more other DMA engines perform DMA writes. The DMA engine(s) performing DMA reads can operate in parallel with the DMA engine(s) performing DMA write. That is, the DMA engine 215 can perform a DMA write at the same time it performs a DMA read.

FIG. 3 also illustrates an external DPE controller 315 and parameters 320. In this embodiment, the DPE controller 315 is external to the DPE 110 but is part of the SoC 100. For example, the DPE controller 315 may be implemented in the PS 130, the PL 125 or some other hardware element in the SoC 100. In one embodiment, the DPE controller 315 configuresicontrols the complete DPE building blocks, which includes the DMA engine 215 as well as configuring and controlling the stream switch in the interconnect 205 illustrated in FIG. 2.

The DMA engine 215 includes buffer descriptors (BDs) 325 which define the parameters 320 of the DMA memory transfer. The parameters 320 contain information for configuring the DMA engine 215 to perform non-sequential writes or reads to the memory banks 220. The parameters 320 can be used to perform many different types of non-sequential reads or writes. For example, the parameters 320A may contain information that the DMA engine 215 uses to perform a 5×7 matrix transposition using a first non-sequential write pattern while the parameters 320B contains information for performing a 8×4 matrix transposition using a second non-sequential read pattern. The SoC 100 can store as many parameters 320 as there are different functions that can be performed using non-sequential reads and writes. That is, the SoC 100 could store parameters 320 for performing matrix transpositions, matrix reductions, storing sequential data in different banks 220, and the like.

The parameters 320 for performing non-sequential read and writes can be programmed by a user (using a tool) or generated by a compiler when configuring the SoC 100. In one embodiment, the parameters 320 are generated before runtime (before the SoC 100 begins to operate). However, in another embodiment, the parameters 320 can be generated on the fly—i.e., during runtime.

In one embodiment, the external DPE controller 315 uses the parameters 320 to configure the BDs 325 which control the DMA engine 215. For example, the DMA engine 215 may have a predetermined number of BOs 325 that can be used to perform reads and writes. The BDs 325 can be used to perform non-sequential, and sequential, reads and writes. For example, when submitting tasks to the DMA engine 215, the DPE controller 315 can instruct which BD 325 to use when perform the task—e.g., a DMA read or write. Depending on which BD 325 was selected controls how the DMA engine 215 performs the task. For example, if the BD 325 was configured using the parameters 320A, the DMA engine 215 performs the DMA write using a first non-sequential write pattern but if the BD 325 was configured using the parameters 320B, the DMA engine 215 performs the DMA write using a second non-sequential write pattern.

The DPE controller 315 can submit multiple different tasks into a queue (not shown) for the DMA engine 215. The DPE controller 315 can indicate, for each task, the corresponding BD, Thus, a DMA engine 215 can use different non-sequential, and sequential, write patterns when executing tasks in its queue depending on the selected BDs.

In one embodiment, the DMA engine 215 is a multi-channel DMA engine. The engine 215 can have multiple input DMA channels that write to the memory banks 220 and multiple output DMA channels that read from the memory banks 220. In one embodiment, these input and output channels are independent (i.e., can operate asynchronously). The BDs 325 (and the parameters 320) are a pool of resources shared across the DMA channels. However, in another embodiment, the BDs 325 could be private to each DMA channel. Each BD 325 (or list of BDs 325) can be executed only once or run in infinite mode (where the BDs 325 are executed continuously). Further, each of the input/output DMA channels may have its own job queue and address generator unit.

In one embodiment, during configuration or compilation, the DPE controller 315 can use the parameters 320 to configure the BDs. Moreover, because there may be a limited number of BDs, the DPE controller 315 may reconfigure the BDs during runtime. For example, if the DPE controller 315 wants to perform a task using a non-sequential write pattern that one of the BDs is not currently configured to perform, the DPE controller 315 can use the parameters 320 for that write pattern to reconfigure one of the BDs to perform the pattern. That is, the SoC 100 may store parameters 320 for performing more read and write patterns than there are BDs in the SoC 100, The DPE controller 315 can then use the parameters 320 to reconfigure the BDs on the fly if the DPE controller 315 wants to perform a task using a different read or write pattern.

In one embodiment, new parameters can be generated by the DPE controller 315 during run time. For example, the DPE controller 315 may include logic for identifying a particular non-sequential read or write pattern that would be useful for performing a task. The DPE controller 315 can then generate the parameters 320 for the non-sequential pattern and configure a BD for executing the DMA reads or writes.

Figure 4:
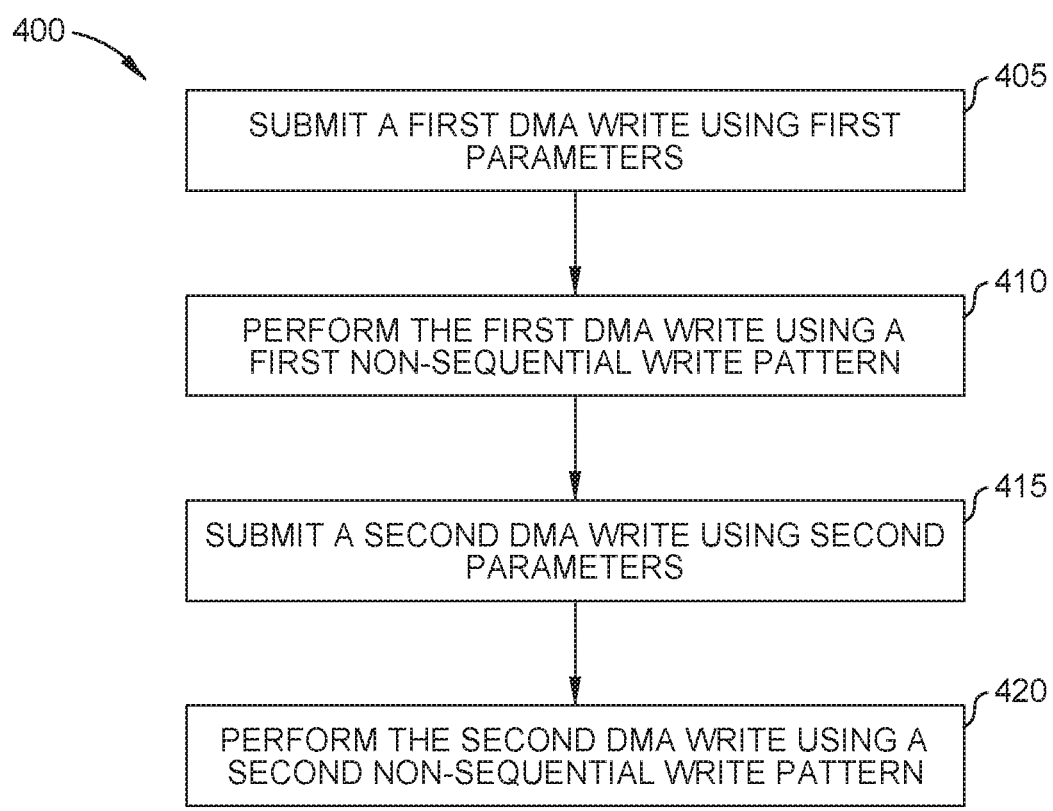
FIG. 4 is a flowchart for performing non-sequential DMA writes, according to an example.

FIG. 4 is a flowchart of a method 400 for performing non-sequential DMA writes, according to an example. At block 405, the DPE controller submits a first DMA write using first parameters that define a first non-sequential write pattern. That is, when writing data received from the stream switch, the DMA engine writes sequentially received data into non-sequential memory addresses, either non-sequential memory addresses in the same memory bank or into different memory banks.

In one embodiment, for two dimensions (2D), the address generator in the DMA engine generates an address (e.g., a 32-byte address) using the following equation:

$$\text{Address} = \text{BaseAddress} + X_n + Y_n \quad (1)$$

$X_n$ can be expressed by the following equation:

$$X_n = X_{offset} * \left(\frac{n}{X_{incr}} \bmod X_{wrap}\right) \quad (2)$$

$Y_n$ can be expressed by the following equation:

$$Y_n = Y_{offset} * \left(\frac{n}{Y_{incr}} \bmod Y_{wrap}\right) \quad (3)$$

where $0 < X_{wrap} \leq 0x100$, $0 < X_{incr} \leq 0x100$, $0 \leq X_{offset} < 0x2000$, and the sample index n=0, 1, 2, .... In one embodiment, the BaseAddress, $X_{offset}$, $X_{wrap}$, $X_{incr}$, $Y_{offset}$, $Y_{wrap}$ and $Y_{incr}$ values are user-defined and defines the addresses for a DMA transfer. In this example, these six values are the parameters (e.g., the parameters 320 in FIG. 3) that define the non-sequential write. Put differently, by changing the values of these six parameters, the DPE controller can define a different non-sequential write or read pattern. With X and Y addressing scheme illustrated in Equations 1-3, many different addressing schemes are possible. In one embodiment, the smallest data entity that the DMA engine can move is 32-bit, due to the width of the stream protocol being used (e.g., AXI-Stream) and the smallest writeable entity for the memories.

Other embodiments include formulations in 3D, 4D and higher dimensions. This is achieved by adding additional parameters to the BD.

In one embodiment, to perform linear addressing (e.g., a sequential write or read pattern), the address can be generated using the parameters defined in Table 1,

TABLE 1

|  | X | Y |
|---|---|---|
| Offset | 1 | 256 |
| Incr | 1 | 256 |
| Wrap | 256 | 256 |

In one embodiment, the parameters can be modified to perform interleaved addressing (e.g., one type of non-sequential write or read pattern) for streams where data for different wireless carriers or from different wireless devices is interleaved in the stream. Storing the interleaved data into different memory banks can be accomplished using the following equation:

Address=BaseAddress+RegionOffset*(n/1 mod C)+1*(n/C)mod channelSize)  (4)

In Equation 4, n is the nth stream data and RegionOffset is the address offset between two memory regions (e.g., two memory banks).

For example, if there are 5 channels and 7 data for each channel being interleaved, data can be unpacked to memory having five non-contiguous memory regions, each memory region containing the data for each channel. Using the above address generation in Equation 4 with this data stream gives the following scheme.

Address=BaseAddress+7*(n/1 mod 5)+1*(n/5 mod 7)  (5)

The BD could be configured to perform this non-sequential write pattern using the parameters provided in Table 2.

TABLE 2

|  | X | Y |
|---|---|---|
| Offset | 7 | 1 |
| Incr | 1 | 5 |
| Wrap | 5 | 7 |

In one embodiment, the parameters can be modified to perform interleaved addressing for matrix addressing, also referred to as matrix reduction (e.g., another type of non-sequential write or read pattern). In one example, stream data contains linearly data for a matrix (row by row) and the DMA engines store this data linearly in memory, but each new row should start on a 128-bit aligned address. The BD could be configured to perform this non-sequential write pattern using the parameters provided in Table 3.

TABLE 3

|  | X | Y |
|---|---|---|
| Offset | 1 | AlignedRowOffset |
| Incr | 1 | RowSize |
| Wrap | RowSize | 256 |

In one embodiment, the parameters can be modified to perform matrix transpose addressing (e.g., another type of non-sequential write or read pattern). In one example, stream data contains linear data for a matrix in row major order. The DMA engine should store the linear data in a column major. The BD could be configured to perform this non-sequential write pattern using the parameters provided in Table 4.

TABLE 4

|  | X | Y |
|---|---|---|
| Offset | ColSize | 1 |
| Incr | 1 | RowSize |
| Wrap | RowSize | ColSize |

For example, the following parameters in Table 5 can be used to configure a BD to transpose a 6×5 matrix.

TABLE 5

|  | X | Y |
|---|---|---|
| Offset | 6 | 1 |
| Incr | 1 | 5 |
| Wrap | 5 | 6 |

At block 410, the DMA engine performs the first DMA write using a first non-sequential write pattern. That is, the DMA engine uses the parameters defining the first non-sequential write pattern (e.g., one of the parameters provided in Tables 1-5 as an example) to perform the DMA write. In one embodiment, the DMA engine uses a BD configured with the parameters to perform the DMA write. For example, when submitting the DMA write as a task to the queue, the DPE controller may indicate which BD (or parameters) should be used.

In one embodiment, the DMA engine performs block 410 after acquiring a lock from the HSC. As discussed above, the HSC can synchronize access to the memory banks for the DMA engine and the core in the DPE, as well as for cores in other DPEs. Once the first DMA write is finished, the DMA engine can release the lock so that other actors (e.g., the core in the same DPE or other cores) can access the data.

At block 415, the DPE controller submits a second DMA write using second parameters. In one embodiment, the DPE controller may submit a task to the queue for performing the second DMA write. The task may include a different BD (configured using a different set of parameters) than the BD used when performing the first DMA write. In another embodiment, rather than using a different BD, the DPE controller may have reconfigured the BD using the second parameters. That is, rather than using a different BD, the DPE controller can reuse the same BD but configure it using the second parameters.

At block 420, the DMA engine performs the second DMA write using a second non-sequential write pattern (e.g., after acquiring a lock from the HSC). That is, the DMA write is performed using the non-sequential write pattern defined by the second parameters, which is different than the non-sequential write pattern defined by the first parameters. For example, the first DMA write may have performed a matrix transpose using the first parameters while the second DMA write selects a subset of a matrix for storage using the second parameters. In this manner, the DMA engine can perform different tasks using different non-sequential write patterns.

Of course, in addition to switching between two DMA writes that use two different non-sequential write patterns, the DMA engine may also switch to performing a DMA write using a sequential or linear addresses where the received data is written in sequential memory addresses. For example, the second DMA write may use a sequential write pattern rather than a non-sequential write pattern.

Figure 5:
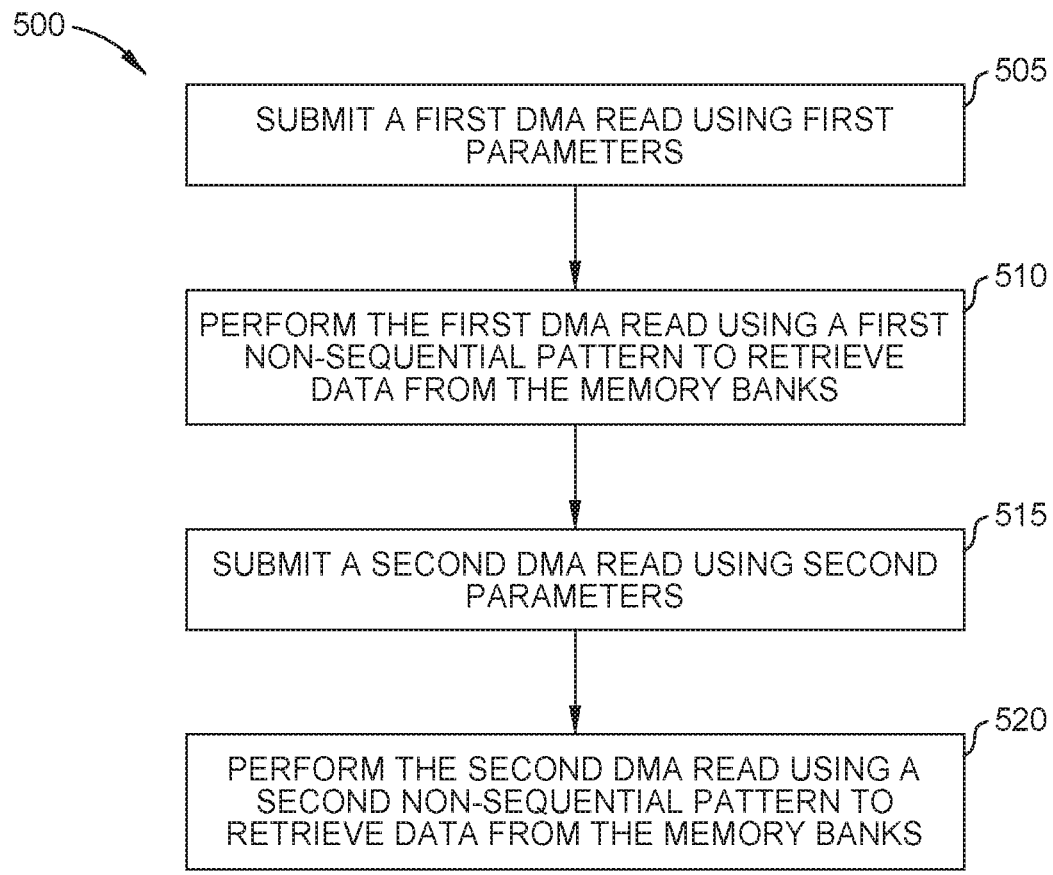
FIG. 5 is a flowchart for performing non-sequential DMA reads, according to an example.

FIG. 5 is a flowchart of a method 500 for performing non-sequential DMA reads, according to an embodiment. At block 505, the DPE controller submits a first DMA read using first parameters. In one embodiment, the DMA read instructs the DMA engine to retrieve (La, read) data from a memory block or blocks in the DPE and forward the retrieved data to the stream switch. The stream switch can forward this data to another stream switch along a path that can lead to another DPE or to the SoC interface block.

At block 510, the DMA engine performs the first DMA read using a first non-sequential read pattern to retrieve data from the memory banks. That is, rather than retrieving data from sequential memory addresses, the DMA engine uses the first parameters to retrieve the data from non-sequential memory addresses according to the first non-sequential read pattern. For example, the target of the data may prefer the data is interleaved in a certain manner. The first parameters can define the first non-sequential read pattern to retrieve the data so that the data is interleaved as desired. For example, the DMA engine may retrieve a first data chunk from the first memory bank, a second data chunk from the second memory bank, a third data chunk from the third memory bank, and so forth.

At block 515, the DPE controller submits a second DMA read using second parameters. The second parameters define a second non-sequential read pattern that is different from the first non-sequential read pattern defined by the first parameters.

At block 520, the DMA engine performs the second DMA read using the second non-sequential read pattern to retrieve data from the memory banks. For example, the second non-sequential read pattern may read from the memory banks using a different pattern than the first non-sequential read pattern. Or the second non-sequential read pattern may read from non-sequential addresses in the same memory bank.

Of course, in addition to switching between two DMA reads that use two different non-sequential read patterns, the DMA engine may also switch to performing a DMA read using a sequential or linear addresses where the data is retrieved from sequential memory addresses. For example, the second DMA read may use a sequential read pattern rather than a non-sequential read pattern to retrieve data from memory.

Like in the method 400, blocks 510 and 520 may be performed after acquiring locks from the HSC. Further, when these DMA reads are complete, the locks can be released to the HSC so that other actors in the SoC can access the data.

In addition to performing the methods 400 and 500 using a DMA engine and memory banks in the same DPE, the methods 400 and 500 can be performed between a DMA engine and memory banks in different DPEs. In that example, one output DMA channel of a DMA engine in a first DPE pushes data into a streaming interconnect (e.g., the interconnect 205 in FIG. 2) that routes the data to an input DMA channel in a second DPE. In yet another embodiment, streaming data coming from programmable logic (e.g.; PL 125) in the SoC can be routed (using the SoC interface block 115 and the interconnect 205) to an input DMA channel in a first DPE to write data into the memory banks. Similarly, an output DMA channel can be used to perform a DMA read from the memory banks which is then routed to PL (or some other circuitry in the SoC that is external to the DPE array 105.

Figure 6:
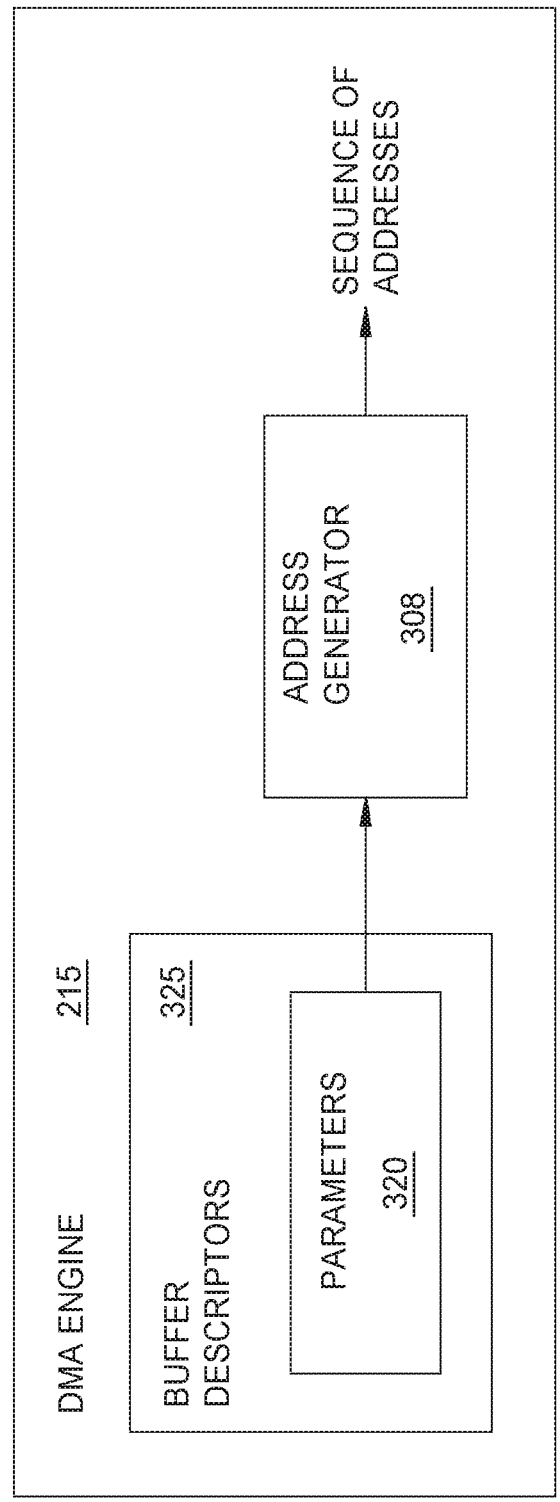
FIG. 6 is a block diagram of a system for performing non-sequential DMA reads and writes, according to an example.

FIG. 6 is a block diagram of a DMA engine 215 for performing non-sequential DMA reads and writes, according to an example. As shown, the DMA engine 215 includes the buffer descriptors 325 and an address generator 308. As discussed above, the buffer descriptors 325 include parameters 320 (e.g., the parameters 320A-B in FIG. 3) which are passed to the address generator 308. The parameters 320 contain information for configuring the DMA engine 215 to perform non-sequential writes or reads to the memory banks and can include any of the various types of non-sequential reads or writes discussed above. In the embodiments herein, the address generator 308 uses a non-sequential read/write pattern derived from the parameters 320 to generate a sequence of memory addresses that retrieves data from non-sequential memory locations in the memory banks or writes data to non-sequential memory locations in the memory banks.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC), comprising:
a switch;
a direct memory access (DMA) engine comprising multiple reconfigurable buffer descriptors configured with respective address generation parameters; and
a memory;
wherein the DMA engine is configured to:
receive data from the switch,
select a first one of the buffer descriptors for a first DMA write request based on a first instruction received by the DMA engine, and
write the data to the memory in a first non-sequential write pattern based on the address generation parameters of the first buffer descriptor.

2. The IC of claim 1, wherein the memory comprises memory banks, wherein the DMA engine generates a first memory address for a first one of memory banks to store a first data chunk and generates a second memory address for a second one of the memory banks to store a second data chunk, wherein the first and second data chunks are sequentially received from the switch.

3. The IC of claim 1, wherein the DMA engine is further configured to:
receive subsequent data from the switch;
select a second one of the buffer descriptors based on a second instruction received by the DMA engine; and
write the subsequent data to the memory in a second non-sequential write pattern based on the address generation parameters of the second buffer descriptor.

4. The IC of claim 1, wherein the first non-sequential write pattern results in the DMA engine performing a matrix function.

5. The IC of claim 4, wherein the matrix function is one of: transposing matrix data received from the switch and storing a sub-portion of a matrix defined by the matrix data received from the switch.

6. The IC of claim 1, wherein the first non-sequential write pattern results in the DMA engine de-interleaving the data as the DMA engine writes the data to the memory.

7. The IC of claim 1, further comprising:
controller circuitry configured to replace the address generation parameters of one or more of the buffer descriptors during runtime.

8. A system on a chip (SoC), comprising:
a direct memory access (DMA) engine comprising multiple reconfigurable buffer descriptors (BDs) configured with respective address generation parameters; and
memory;
wherein the DMA engine is configured to:
receive a first DMA read request,
select a first one of the BDs based on a first instruction received by the DMA engine, and
read a first pattern of non-sequential addresses of the memory based on the address generation parameters of the first BD.

9. The SoC of claim 8, wherein the memory comprises memory banks, wherein the DMA engine generates a first memory address for a first one of memory banks to retrieve a first data chunk and generates a second memory address for a second one of the memory banks to retrieve a second data chunk, and wherein the first and second data chunks are sequentially retrieved by the DMA engine when reading the first pattern of non-sequential addresses.

10. The SoC of claim 8, wherein the DMA engine generates a first memory address for a first memory bank of the memory to retrieve a first data chunk and generates a second memory address for the first memory bank to retrieve a second data chunk, wherein the first and second data chunks are sequentially retrieved by the DMA engine when reading the first pattern of non-sequential addresses of the memory, and wherein the first and second memory addresses are non-sequential memory addresses in the first memory bank.

11. The SoC of claim 8, wherein the first non-sequential read pattern results in the DMA engine performing a first matrix function when reading the first pattern of non-sequential addresses of the memory.

12. The SoC of claim 8, wherein the DMA engine is further configured to:
receive a second DMA read request;
select a second one of the BDs based on a second instruction received by the DMA engine; and
read a second pattern of non-sequential addresses of the memory based on the address generation parameters of the second BD;
wherein the first pattern of non-sequential addresses differs from the second pattern of non-sequential addresses.

13. The SoC of claim 12, wherein the second non-sequential read pattern results in the DMA engine performing a second matrix function when reading the second pattern of non-sequential addresses of the memory, wherein the second matrix function differs from a first matrix function performed when reading the first pattern of non-sequential addresses of the memory.

14. The SoC of claim 8, further comprising:
controller circuitry configured to replace the address generation parameters of one or more of the buffer descriptors during runtime.

15. A method, comprising:
configuring multiple buffer descriptors of a direct memory access (DMA) engine with respective address generation parameters;
receiving a first DMA write request;
selecting a first one of the buffer descriptors based on a first instruction received by the DMA engine; and
writing data to a memory in a first non-sequential write pattern based on the address generation parameters of the first buffer descriptor.

16. The method of claim 15, further comprising:
receiving a second DMA write request;
selecting a second one of the buffer descriptors based on a second instruction received by the DMA engine; and
writing subsequent data to the memory in a second non-sequential write pattern based on the address generation parameters of the second buffer descriptor.

17. The method of claim 15, wherein the writing comprises:
generating a first memory address for a first memory bank to store a first data chunk of a data stream based on the address generation parameters of the first buffer descriptor; and
generating a second memory address for a second memory bank to store a second data chunk of the data stream based on the address generation parameters of the first buffer descriptor.

18. The method of claim 15, wherein the writing comprises:
generating a first memory address for a first memory bank to store a first data chunk of a data stream based on the address generation parameters of the first buffer descriptor; and
generating a second memory address for the first memory bank to store a second data chunk of the data stream based on the address generation parameters of the first buffer descriptor, wherein the first and second memory addresses are non-sequential memory addresses in the first memory bank.

19. The method of claim 15, wherein the first non-sequential write pattern results in the DMA engine performing a first matrix function when performing the writing.

20. The method of claim 15, wherein the non-sequential write pattern results in the DMA engine de-interleaving the data as the DMA engine writes the data to the memory.

* * * * *